(12) United States Patent
Kim

(10) Patent No.: US 7,329,398 B2
(45) Date of Patent: Feb. 12, 2008

(54) PREPARATION OF CARBON NANOTUBES

(75) Inventor: Young-Nam Kim, Kyungbuk (KR)

(73) Assignee: KH Chemicals Co., Ltd., Seoul (KR)

(*) Notice: Subject to any disclaimer, the term of this patent is extended or adjusted under 35 U.S.C. 154(b) by 406 days.

(21) Appl. No.: 10/257,159

(22) PCT Filed: Sep. 6, 2001

(86) PCT No.: PCT/KR01/01512

§ 371 (c)(1),
(2), (4) Date: Mar. 18, 2003

(87) PCT Pub. No.: WO03/008331

PCT Pub. Date: Jan. 30, 2003

(65) Prior Publication Data

US 2003/0161782 A1    Aug. 28, 2003

(51) Int. Cl.
*D01F 9/12* (2006.01)
(52) U.S. Cl. .................. 423/447.3; 977/843
(58) Field of Classification Search ......... 423/447.3, 423/460; 447/249.1; 427/249.1; 977/843, 977/742
See application file for complete search history.

(56) References Cited

U.S. PATENT DOCUMENTS 5,424,054 A * 6/1995 Bethune et al. ......... 423/447.2

FOREIGN PATENT DOCUMENTS

JP    2001-062299    * 3/2001

JP    2002-220214    8/2002

OTHER PUBLICATIONS

Ago, et al. "New Rout to Synthesize Multiwall Carbon Nanotubes: Vapor-phase Reaction using Colloidal Solution of Metal Nanoparticles," Jul. 27-28, 2000; Abstracts The 19th Fullerene General Symposium.*
Ago, et al. "Dispersion of metal nanoparticles for aligned carbon nanotube arrays," Jul. 3, 2000; Applied Physics Letters, vol. 77, No. 1, pp. 79-81.*
H. Bonnemann, et al "Nanoscale colloidal metals and alloys stabilized by solvents and surfactants Preparation and use as catalyst precursors," 1996, Journal of Organometallic Chemistry 520, pp. 143-162.*

(Continued)

*Primary Examiner*—Stuart L. Hendrickson
*Assistant Examiner*—Daniel C. McCracken
(74) *Attorney, Agent, or Firm*—Blakely, Sokoloff, Taylor & Zafman; Stephen M. De Klerk

(57) ABSTRACT

The present invention is to provide a process for the preparation of carbon nanotubes or nanofibers, which comprises introducing in a gaseous phase a colloidal solution of metal nanoparticles optionally containing a surfactant together with an optional carbon source into a heated reactor, and carbon nanotubes or nanofibers thus prepared.

According to the present invention, the shape and structure of carbon nanotubes or nanofibers can be easily controlled, the carbon nanotubes or nanofibers can be continuously produced in large scales, the apparatus and the process for the preparation of nanotubes or nanofibers are simplified, and carbon nanotubes or nanofibers having various shapes, structures and properties can be easily and cheaply prepared. Further, the process of the present invention is highly reproducible and favorable in industry.

8 Claims, 7 Drawing Sheets

OTHER PUBLICATIONS

Ago, Hiroki, "New Route to Synthesize Multiwall Carbon Nanotubes: Vapor-phase Reaction using Colloidal Solution of Metal Nanoparticles," *Abstracts: The 19th fullerene General Symposium*, Jul. 27, 2000, p. 26.

Ago, Hiroki, "Dispersion of metal nanoparticles for aligned carbon nanotube arrays," *Applied Physics Letters*, Jul. 3, 2000, pp. 79-82, vol. 77, No. 1.

McKee, D.W., "The Catalyzed Gasification Reactions of Carbon," *Corporate Research and Development Center, General Electric Company*, pp. 1-117.

McKee, D.E., et al. "The Catalytic Behavior of Alkali Metal Carbonates and Oxides in Graphite Oxidation Reactions," *Carbon*, 1975, pp. 381-390, vol. 13, Great Britain.

Maruyama, Shigeo, et al. "Low-temperature synthesis of high-purity single-walled carbon nanotubes from alcohol," *Chemical Physics Letters*, 2002, pp. 229-234, 360.

Ago, Hiroki, "Gas-Phase Synthesis of Single-wall Carbon Nanotubes from Colloidal Solution of Metal Nanoparticles," *American Chemical Society*, 2001, pp. 1-4.

\* cited by examiner

PREPARATION OF CARBON NANOTUBES

CROSS-REFERENCE TO OTHER APPLICATION

This Application is a National Phase of International Application No. PCT/KR01/01512, filed on Sep. 6, 2001, which claims priority from Korean Patent Application No. 2001-43659, filed on Jul. 20, 2001.

TECHNICAL FIELD

The present invention relates to a process for the preparation of carbon nanotubes, particularly to a process enabling continuous bulk preparation of carbon nanotubes or carbon nanofibers in which catalytic metal nanoparticles having preliminarily controlled composition, particle size and particle distribution are continuously introduced. More specifically, the present invention is to provide a process for the preparation of carbon nanotubes or nanofibers, which comprises introducing in a gaseous phase a colloidal solution of metal nanoparticles, preferably containing an optional surfactant, together with a carbon source into a heated reactor, and carbon nanotubes or carbon nanofibers obtained from the same process. Therefore, the present invention is highly reproducible and industrially promising.

BACKGROUND ART

A carbon nanotube is a substance in which a carbon atom is bonded to neighboring three carbon atoms, these bonded carbon atoms forming a hexagonal ring with other adjacent bonded carbon atoms and such rings being repeated in a honeycomb pattern to form a sheet which rolls into a cylindrical tube.

Such carbon nanotubes may have a diameter ranging from several angstroms (Å) to several nanometers (nm), with the length ranging from ten-folds to thousand-folds of the diameter. Extensive studies have been carried out on the synthesis of carbon nanotubes since these nanotubes have a morphological feature as described above and excellent thermal, mechanical and electrical characteristics originating from their chemical bonding. It is now expected that utilization of carbon nanotubes having these characteristics would lead to the development of numerous products which still face the technical limitation of the existing materials, and to the impartation of new, previously unpossessed characteristics to developed products.

For the synthesis of carbon nanotubes, various techniques have been proposed, including arc discharge, laser evaporation, thermal chemical vapor deposition (CVD), catalytic synthesis, plasma synthesis and the like [See U.S. Pat. No. 5,424,054 (arc discharge); Chem. Phys. Lett. 243, 1-12 (1995) (laser evaporation); Science, 273: 483-487(1996) (laser evaporation); U.S. Pat. No. 6,210,800 (catalytic synthesis); U.S. Pat. No. 6,221,330 (gaseous phase synthesis); WO 00/26138 (gaseous phase synthesis)]. In these methods, carbon nanotubes are synthesized under severe reaction conditions, for example, at high temperatures of several hundred degrees to several thousand degrees in Celsius, or in vacuum. Further, the type of reaction used is a batch-type reaction, instead of a continuous flow type reaction, such that continuous preparation of carbon nanotubes is impossible, and only small amounts of carbon nanotubes are produced in batch reactions.

Accordingly, said methods have the problem of facing limitation in mass production of nanotubes at low costs, and therefore it is desired to develop a suitable process for the gas-phase synthesis, especially a process for continuous synthesis which is industrially useful.

The Oakridge National Laboratory and R. E. Smalley et al of Rice University in the United States reported respectively processes for the synthesis of carbon nanotubes in the gaseous phase. In these gas-phase synthetic processes, an organometallic compound in which a transition metal is bound to an organic compound in the molecular level, such as ferrocene or iron pentacarbonyl, is introduced in the solid state into a reactor as a catalyst promoting the synthesis of carbon nanotubes. As shown in the above-mentioned prior art, the conventional processes for the gas-phase synthesis of carbon nanotubes are carried out in a reactor that is divided into two reaction zones. A catalytic metal precursor is first introduced in the solid state to the first reaction zone where the precursor is vaporized in the molecular level by gradual heating. The vaporized catalytic metal molecules are transferred to the second reaction zone which is maintained at a higher temperature, where the molecules are subjected to pyrolysis so that the metal atoms form ultrafine particles. These ultrafine particles aggregate, while colliding into each other, to form fine particles, and then the fine metal particles may be used as the catalyst for the growth of carbon nanotubes. However, it has been reported that the particles are required to have a certain size, preferably of nanometers, in order to function as a catalyst [See U.S. Pat. No. 6,221,330 or WO 00/26138].

However, in the conventional gaseous synthesis methods for carbon nanotubes, catalyst particles form irregularly in the reactor, and thus it is practically impossible to expect uniform growth of catalyst particles in controlled size. Moreover, as transition metals differ from each other in their physical properties, it is difficult to prepare nanometer-sized catalyst particles comprising two or more transition metal species and having uniform composition and controlled size. Consequently, it is extremely difficult or hardly possible to produce characterized carbon nanotubes comprising two or more transition metals in uniform composition. Furthermore, since it is impossible to control the particle size and metal composition of catalytic metals in the conventional gas-phase synthetic processes, it is difficult to produce carbon nanotubes of high purity. In particular, the process suggested by Smalley et al. has a drawback that the reaction should be carried out at elevated pressures.

The inventors of the present invention have discovered that carbon nanotubes can be produced by suspending nanometer-sized fine metal particles in a gaseous phase as a metal catalyst which has the greatest influence on the properties of carbon nanotubes produced and simultaneously supplying a carbon source, and that most of the problems faced by the conventional gas-phase synthetic processes as described above can be overcome by this novel method.

According to the present invention, (a) since the particle size and composition of the catalyst are pre-determined, the shape and structure of the carbon nanotubes produced thereby can be more easily controlled; (b) since the catalyst as well as the carbon source can be supplied continuously, continuous mass production of carbon nanotubes is possible; (c) since the carbon source is supplied together with the catalytic metal nanoparticles, the process itself can be simplified; and (d) since the reaction process is carried out in mild conditions, the carbon nanotubes or nanofibers having a variety of shapes, structures and properties can be prepared easily at reasonable costs. Conclusively, the process of the present invention is industrially very promising.

DISCLOSURE OF INVENTION

Therefore, the present invention is to provide a process for the preparation of carbon nanotubes or nanofibers, characterized in that nanoparticles of elemental metals or metal compounds (hereinafter, referred to as "metal nanoparticles") or a colloidal solution thereof are introduced in a gaseous phase into a reactor together with an optional carbon source, and to provide carbon nanotubes or nanofibers thus prepared.

According to a preferred embodiment of the present invention, metal nanoparticles are prepared in the form of a colloidal solution optionally containing a surfactant and then are introduced in a gaseous phase into a reactor.

More specifically, the process of the present invention consists of the following steps:

(1) preparing a colloidal solution containing metal nanoparticles in the presence or absence of a surfactant, (2) introducing the resulting colloidal solution into a heated reactor together with a carrier and/or a carbon source, either separately or in the form of a gaseous mixture, and (3) forming carbon nanotubes or nanofibers therefrom.

According to a more preferred embodiment, metal nanoparticles or a colloidal solution thereof may be introduced together with or separately from a carbon source, but preferably they are introduced in the form of a mixture for the formation of uniform carbon nanotubes.

In the present invention, "introducing nanoparticles or a colloidal solution thereof in a gaseous phase" means suspending the fine nanometer-sized particles in a gaseous phase by spraying, injection or atomization, that is, forming a gaseous colloid. Although the nanoparticles of the present invention may be used in the powder form, it is more advantageous to use them in the form of a colloidal solution for the uniformity in the amount of supply, homogeneity in the mixing with the carrier and/or the carbon source, and feasibility of conversion into a gaseous phase.

In general, a colloid represents a solution of solid particles whose size ranges from 1000 Da (Dalton, a unit for the molecular weight) to 0.45 μm (or 0.2 μm). However, "a colloidal solution" used herein means a solution comprising particles of a few nanometers to a few hundred nanometers in size, and occasionally precursors thereof as well.

In the present invention, the term "nanoparticles of elemental metals or metal compounds" or "metal nanoparticles" means nanoparticles having an average particle size in the order of nanometers, for example, of a few nanometers to a few hundred nanometers, in which the metals exist in the elemental and/or compound forms. It also means nanoparticles including those liquid particles having a size in the above-described range, which are obtained by dissolving or dispersing elemental metals or metal compounds in a solvent (e.g., sol particles), or the particles of an emulsion or a dispersion.

The metals in the metal nanoparticles of the present invention may be present in the form of elements, inorganic or organic compounds, or mixtures thereof, and may consist of a single metal species or of two or more species, such as in the form of an alloy or a composite.

Hereinbelow, the invention will be explained in more detail.

When the particle size is in the order of nanometers (typically 300 nm or less), the particles may be different from those of larger sizes in their properties and performance. Nanometer-sized particles have increased surface area per unit mass, and subsequently show improved performance and altered properties such that the melting point of the particles decreases and the color or the particles varies with the size.

Further, the fine particles of nanometer size may be present in the state of being suspended in a gaseous phase and have high reactivity. The present inventors have done studies to develop a method of using such nanometer-sized fine metal particles as a catalyst suitable for the synthesis of carbon nanotubes, particularly for a process for the preparation of carbon nanotubes in a gaseous phase. To the inventors' knowledge, none of the methods that have been proposed thus far make use of fine metal particles prepared in advance, which are introduced in a gaseous phase into the gas-phase synthesis of carbon nanotubes.

In the present invention, the metal nanoparticles or a colloidal solution thereof may be prepared by techniques such as mechanical grinding, co-precipitation, spraying, sol-gel processing, electrolysis, emulsion processing, inverse emulsion processing or the like.

For example, U.S. Pat. No. 5,238,625 discloses a process for preparing a zirconia sol consisting of tetragonal crystal particles of 0.5 μm or less in size by sol-gel processing. U.S. Pat. No. 5,911,965 discloses a process for preparing a solution or sol of stable oxide polytungstate containing about 17% of tungsten oxide from a solution of acidified tungsten oxide precursor by sol-gel processing. This patented invention does not mention about the particle size or distribution of the sol particles, but the particle size is presumed to be of nanometer level. U.S. Pat. No. 6,107,241 discloses a process for preparing by sol-gel processing an amorphous titanium peroxide sol having a particle size of 8 to 20 nm and a sol concentration of 1.40 to 1.60% which is capable of long-term storage at room temperature. U.S. Pat. No. 6,183,658 discloses a process for preparing nanometer-sized, non-cohesive iron-containing oxide particles having a uniform particle size distribution, the surface of which is modified with a silane compound to prevent cohesion. The above-listed patents are incorporated into the present invention for reference.

In particular, U.S. Pat. No. 5,147,841 discloses a process for preparing a colloidal solution of elemental metal nanoparticles by adding a metal salt to an organic solvent containing a surfactant to form homogeneous inverse micelle particles and reducing the metal salt within the micelle particles. This patent is incorporated into the present invention for reference.

The particle size of colloidal metal particles prepared according to the emulsion processing or inverse emulsion processing method are generally of the order of several nanometers to several hundred nanometers and may be adjusted in accordance with the reaction conditions. A surfactant is added to form homogeneous micelle particles and to prevent cohesion of the colloidal metal particles.

As described above, the emulsion processing or inverse emulsion processing method is further advantageous in that metal particles containing two or more metal species may be prepared in the form of a composite or an alloy, and that the weight, the particle size and its distribution of the metal salt micelles may be easily controlled by the types and amounts used of the surfactant and the solvent. The metal salt micelles having a controlled particle size and its distribution can be used as a catalyst either per se or after being reduced to elemental metal particles without substantial changes in the particle size and its distribution. This means that the composition, particle size and distribution of the metal nanoparticles used as a catalyst can be controlled.

Hence, in a preferred embodiment of the present invention, the metal salt micelle particles produced as described above are used as a catalyst either per se or in a reduced form. Specifically, the present invention provides a process for preparing carbon nanotubes, which comprises the following steps:

(1a) preparing a colloidal solution containing metal salt nanoparticles by adding metal salts to a solvent, such as water, or a polar or nonpolar organic solvent, containing a surfactant, (1b) optionally reducing the metal salt nanoparticles in the colloidal solution, (2) introducing the resulting colloidal solution into a heated reactor together with a carrier and/or a carbon source, either separately or in the form of a gaseous mixture, and (3) forming carbon nanotubes or nanofibers therefrom.

The metals used in the present invention are not particularly limited, and may be any metals that can be simply added or used as a catalyst in the process for preparing carbon nanotubes or nanofibers. Examples of such metals include transition metals such as iron, cobalt or nickel; noble metals such as platinum or palladium; and alkali and alkaline earth metals. The types of the metal compounds which may be used in the present invention are not particularly limited, and examples include the elemental metals listed above, their oxides, nitrides, borides, fluorides, bromides and sulfides, and mixtures thereof. If necessary, a metal which does not act as a catalyst in the process of the present invention may be added with a catalytic metal in the form of an alloy or a mixture, and this does not depart from the spirit and the scope of the invention.

Meanwhile, according to the present invention, the colloidal solution of metal nanoparticles may exist as a gaseous colloid for some time when the droplets containing the metal particles are made to suspend in a gas, since these particles are nanometer-sized fine particles. The methods to transform the colloidal solution into a gaseous phase and to suspend the droplets in a gas are not particularly limited, and conventional methods in the art, for example, direct spraying, siphon spraying, atomization, etc., may be used.

The droplets of the colloidal solution containing metal nanoparticles introduced into a reactor in a gaseous phase, as described above, are immediately transformed into nanometer-sized metal particles owing to the high temperature in the reactor and may be used as a catalyst for the growth of carbon nanotubes.

In a variation of the present invention, even if a colloidal solution containing nanoparticles of metal compounds such as oxides is introduced into the reactor without preliminary reduction, the particles are reduced into elemental metal particles in a short time because the fineness of the particles increases their reactivity; or unreduced particles may also be used per se in the process of synthesizing carbon nanotubes.

In the present invention, the surfactant forms fine micelle particles with the metal nanoparticles in the solvent, facilitates uniform distribution of the metal particles, and maintains the size of the metal particles by preventing the cohesion of the metal particles until they are introduced into the reactor. The surfactant may be nonionic, cationic, anionic or zwitterionic, and all types of surfactant may be used, for example, hydrocarbons, silicone compounds, fluorocarbon compounds and so on. The amount of the surfactant used in the invention is not particularly limited and may be adequately selected by a person having ordinary skill in the pertinent art.

Reduction of the metal salts may also be carried out by adding at least one reducing agent selected from the group consisting of, for example, inorganic compounds such as hydrazine, $LiBH_4$ and $NaBH_4$; surfactants having a functional group with reducing power such as ethylene oxide; and organic compounds with reducing power. Reduction may proceed to the extent that the metal salts are reduced partially or completely to metals.

Solvents which may be used to prepare a colloidal solution include water, and polar or nonpolar organic solvents. A polar or nonpolar organic solvent may be selected from the group consisting of aromatic hydrocarbons such as benzene, toluene and xylene; aliphatic organic solvents such as hexane, heptane and octane; polar solvents such as ethanol and propanol; and mixture thereof.

In the present invention, the metal nanoparticles or the colloidal solution thereof may be introduced into the reactor together with a carrier. As the carrier, mention may be made of inert gases such as argon, neon, helium and nitrogen; and polar or nonpolar solvents aforementioned.

Together with the gaseous mixture of the colloidal solution and an optional carrier or separately, a gaseous or liquid carbon source may be supplied. As the carbon source, said surfactants and organic solvents may be used as they are, and other organic compounds selected from the group consisting of hydrocarbons such as carbon monoxide, saturated or unsaturated aliphatic hydrocarbons having 1 to 6 carbon atoms and aromatic hydrocarbons having 6 to 10 carbon atoms may be used as well. Such a carbon source may have 1 to 3 heteroatoms selected from the group consisting of oxygen, nitrogen, chlorine, fluorine and sulfur.

Since the surfactant and/or the solvent of the colloidal solution may also act as the carbon source, when the contents thereof are high, additional carbon sources may not be needed.

According to a preferred embodiment of the present invention, a characterized gas such as $H_2$, $H_2S$ or $NH_3$ may be supplied together with the carbon source.

The process of the present invention may be carried out in a reactor used for reactions such as thermal heating, chemical vapor deposition (CVD), plasma heating, radio frequency (RF) heating and so on. However, the type of the reactor is not limited as long as carbon nanotubes may be produced therein. The reaction processes to form carbon nanotubes or nanofibers using such reactors are described in the prior art above-mentioned. Therefore, without being particularly limited in the present invention, the process parameters for carrying out the present invention, such as the temperature, time and pressure, may be easily decided by a person having ordinary skill in the art from said prior art.

Meanwhile, in the processes of prior art for producing carbon nanotubes in a gaseous phase in which metal particles are formed by aggregation of metal atoms and used as catalysts, it is reported that the lower reaction temperature results in the smaller particle size of the catalytic metal, and subsequently in the smaller length and diameter of the carbon nanotubes produced. However, as the particle size of the catalytic metal is adjusted before being introduced into the reactor in the process of the present invention, it is possible to control the length and diameter of the carbon nanotubes substantially irrespective of the reaction temperature.

The process of the present invention may be favorably applied to the syntheses of carbon nanotubes having various structures and morphologies as well as tube-typed nanoscale structures such as graphite nanofibers (GNF), since the catalyst of the present invention may comprise two or more metal species in any compositions.

BEST MODE OF CARRYING OUT THE INVENTION

The present invention will be understood more easily with reference to the following examples. However, these examples are intended to illustrate the invention and are not to be construed to limit the scope of the invention.

EXAMPLE 1

To 40 ml of benzene, 3.516 g (10% by weight of benzene) of polyoxyethylene (20) sorbitan monolaurate (Tween®-20) and 0.0648 g (a quantity required for preparing a 0.01M benzene solution) of $FeCl_3$ were added, and the mixture was stirred for 24 hours to give a solution of nanoparticles. Tween®-20 is a nonionic surfactant which plays a role of stabilizing the nanoparticles to be formed and reducing the metal ions.

It was confirmed by transmission electron microscopy (TEM) that the nanoparticle solution obtained above contained fine metal particles with a size ranging from 2 to 20 nm.

Reaction was carried out by introducing the obtained solution (0.34 ml/min) together with a carrier gas (Ar, flow rate: 100 sccm) into a reactor at 800° C. for 20 minutes. The product was obtained as a black powder.

Figure 1:
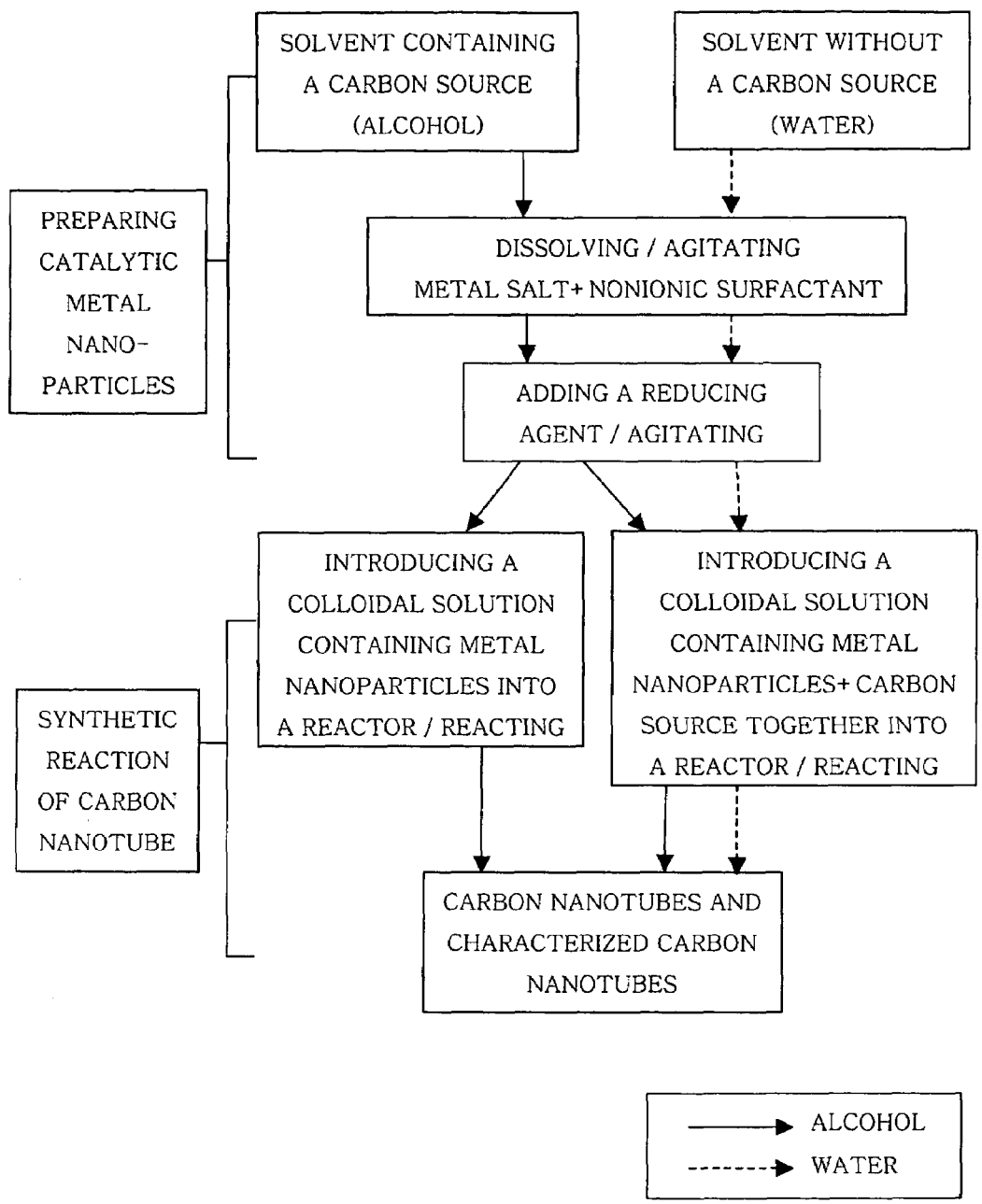
FIG. 1 is a schematic flow diagram showing briefly the process for synthesizing carbon nanotubes of the present invention.
Figure 2:
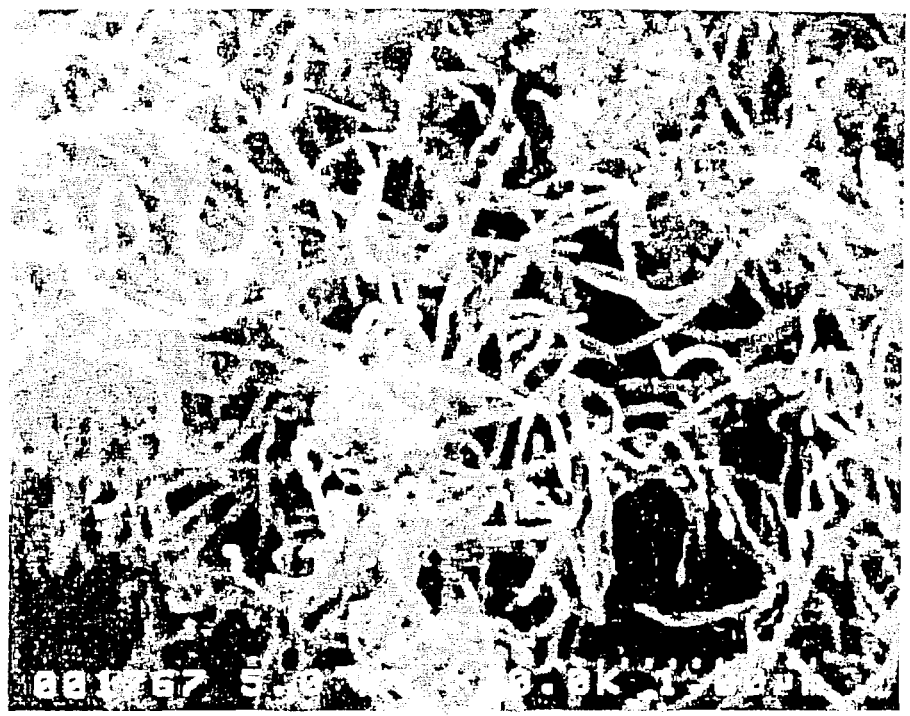
FIGS. 2 to 6 are the scanning electron micrographs (SEM) or transmission electron micrographs (TEM) of the carbon nanotubes prepared in Example 1 (FIG. 2), Example 3 (FIG. 3), Example 5 (FIG. 4), Example 9 (FIG. 5) and Example 13 (FIG. 6), respectively.

The product obtained above was analyzed by scanning electron microscopy (SEM) and transmission electron microscopy (TEM). It was confirmed that carbon nanotubes of a mean diameter of about 60 nm were obtained, and the SEM micrograph showing the nanotubes is shown in FIG. 2.

EXAMPLE 2

To a solution of nanoparticles prepared in the same manner as in Example 1, 0.01 g (0.005 mol) of $LiBH_4$ was added as a reducing agent, and the mixture was stirred for 24 hours to give a solution of nanoparticles with a size ranging from 2 to 20 nm. Somewhat severe flocculation of the particles was observed, compared with the case where no reducing agent was added.

The solution obtained above was introduced into the reactor in the same manner as in Example 1, and carbon nanotubes with a mean diameter of about 70 nm were obtained.

EXAMPLE 3

Figure 3:
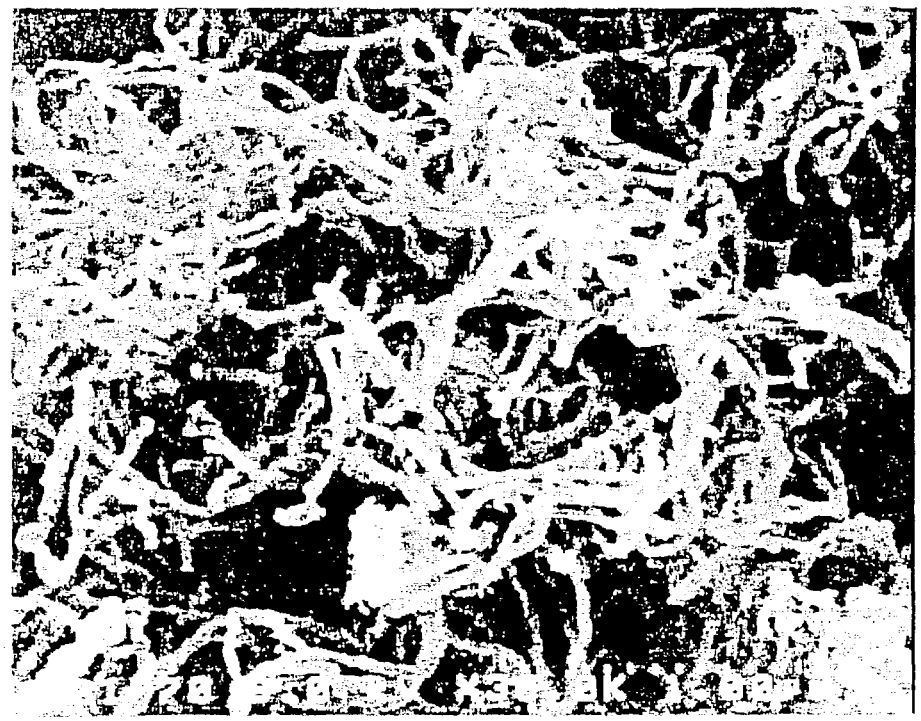

Carbon nanotubes with a mean diameter of about 60 nm were obtained in the same manner as in Example 1, except that toluene or xylene was used respectively in place of benzene. The SEM micrograph of the carbon nanotubes is shown in FIG. 3.

EXAMPLE 4

A result analogous to that of Example 2 was obtained by performing the procedure in the same manner as in Example 2, except that toluene or xylene was used respectively in place of benzene.

EXAMPLE 5

To 40 ml of benzene, 3.516 g (10% by weight of benzene) of cetyl trimethyl-ammoniumbromide (CTAB) and 0.0648 g (a quantity required for preparing a 0.01M benzene solution) of $FeCl_3$ were added, and the mixture was stirred for 24 hours. CTAB is a cationic surfactant which plays a role of stabilizing the nanoparticles to be formed. 0.01 g (0.005M) of $LiBH_4$ was added as a reducing agent to the above-obtained solution, and the mixture was stirred for 24 hours to give a solution of nanoparticles with a size ranging from 2 to 20 nm.

Figure 4:
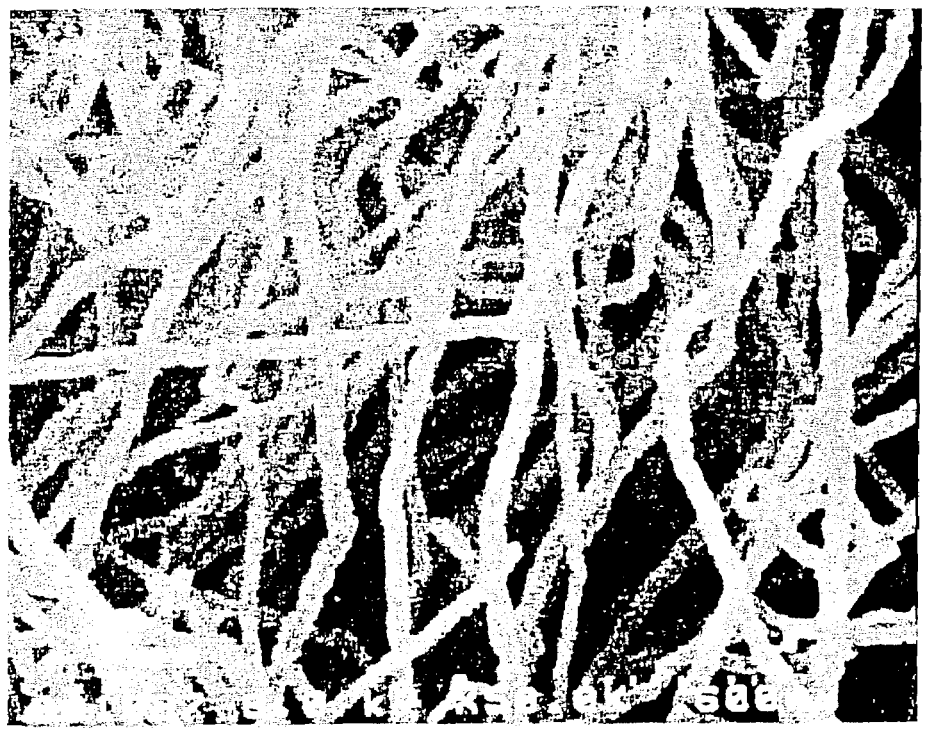

The solution obtained above was introduced into the reactor in the same manner as in Example 1, and carbon nanotubes with a mean diameter of about 70 nm were obtained. The SEM micrograph of the carbon nanotubes is shown in FIG. 4.

EXAMPLE 6

A result identical with that of Example 5 was obtained by performing the procedure in the same manner as in Example 5, except that toluene or xylene was used respectively in place of benzene.

EXAMPLE 7

A solution of nanoparticles with a size ranging from 2 to 20 nm was obtained in the same manner as in Example 5, except that an anionic surfactant, sodium dodecyl-sulfate (SDS), was used.

The solution obtained above was introduced into the reactor in the same manner as in Example 1, and carbon nanotubes with a mean diameter of about 70 nm were obtained.

EXAMPLE 8

A result identical with that of Example 7 was obtained by performing the procedure in the same manner as in Example 7, except that toluene or xylene was used respectively in place of benzene.

EXAMPLE 9

A solution of nanoparticles with a size ranging from 2 to 50 nm was obtained in the same manner as in Example 1, except that water was used in place of benzene as the solvent.

Figure 5:

The solution obtained above was introduced into the reactor in the same manner as in Example 1, but this time together with a carbon source (ethylene gas, 50 sccm), and carbon nanotubes with a mean diameter of about 60 nm were obtained. The SEM micrograph of the carbon nanotubes is shown in FIG. 5.

EXAMPLE 10

A result identical with that of Example 9 was obtained by performing the procedure in the same manner as in Example 9 except that methane gas was used in place of ethylene as the carbon source.

EXAMPLES 11 AND 12

Results identical with those of Examples 9 and 10 were obtained by performing in the same manner as in Examples 9 and 10, except that ethanol was used in place of water.

EXAMPLE 13

To a solution of nanoparticles prepared in the same manner as in Example 9, 0.065 g (0.005 mol) of hydrazine was added as a reducing agent, and the mixture was stirred for 24 hours to give a solution of nanoparticles with a size ranging from 2 to 50 nm. Somewhat severe flocculation of the particles was observed, compared with the case where no reducing agent was added.

Figure 6:
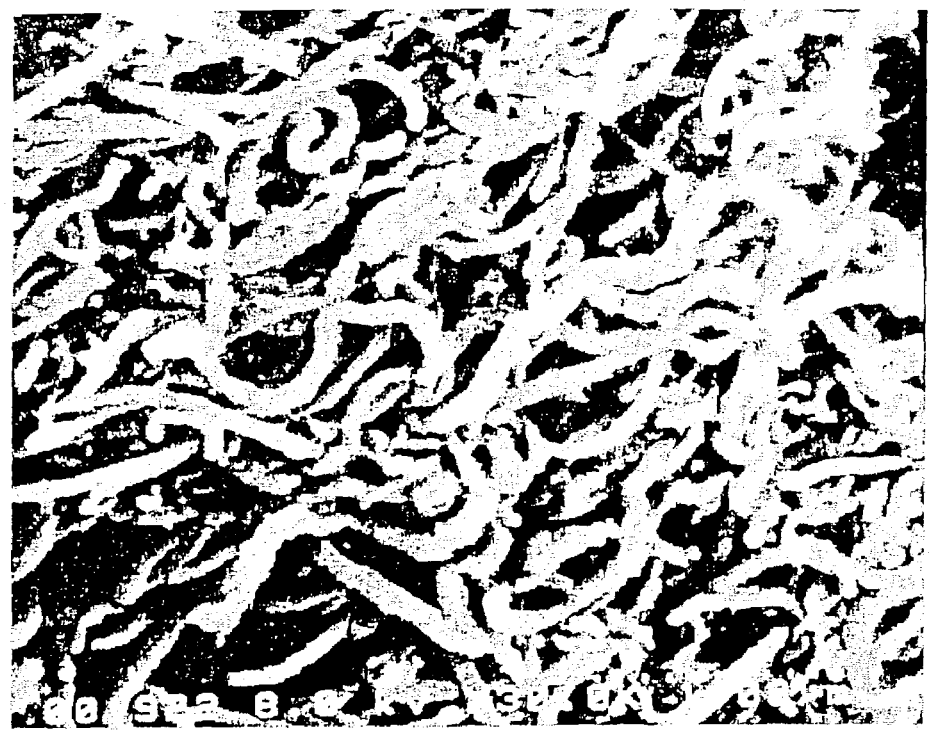

The solution obtained above was introduced into the reactor in the same manner as in Example 9, and carbon nanotubes with a mean diameter of about 80 nm were obtained. The SEM micrograph of the nanotubes is shown in FIG. 6.

EXAMPLE 14

A result identical with that of Example 9 was obtained by performing in the same manner as in Example 9, except that methane gas was used in place of ethylene as the carbon source.

EXAMPLE 15

To a solution of nanoparticles prepared in the same manner as in Example 11, 0.065 g (0.005 mol) of hydrazine was added as a reducing, and the mixture was stirred for 24 hours to give a solution of nanoparticles with a size ranging from 2 to 50 nm. Somewhat severe flocculation of the particles was observed, compared with the case where no reducing agent was added.

The solution obtained above was introduced into the reactor in the same manner as in Example 11, and carbon nanotubes with a mean diameter of about 70 nm were obtained.

EXAMPLE 16

A result identical with that of Example 15 was obtained by performing in the same manner as in Example 15, except that methane gas was used in place of ethylene as the carbon source.

EXAMPLE 17

A solution of nanoparticles with a size ranging from 2 to 50 nm was obtained in the same manner as in Example 5, except that water was used as the solvent in place of benzene and 0.0065 g (0.005 mol) of hydrazine was used as the reducing agent in place of 0.01 g (0.005 mol) of $LiBH_4$.

The solution obtained above was introduced into the reactor in the same manner as in Example 1, but this time together with a carbon source (ethylene gas, 50 sccm) and with the reactor heated to 900° C. Carbon nanotubes of a mean diameter of about 70 nm were obtained.

EXAMPLE 18

A result identical with that of Example 17 was obtained by performing the procedure in the same manner as in Example 17, except that methane gas was used in place of ethylene.

EXAMPLES 19 AND 20

Results identical with those of Examples 17 and 18 were obtained by performing in the same manner as in Examples 17 and 18, except that ethanol was used in place of water.

EXAMPLE 21

A solution of nanoparticles with a size ranging from 2 to 50 nm was obtained in the same manner as in Example 7, except that water was used as the solvent in place of benzene and 0.0065 g (0.005 mol) of hydrazine was used as the reducing agent in place of 0.01 g (0.005 mol) of $LiBH_4$.

The solution obtained above was introduced into the reactor in the same manner as in Example 1, but this time together with a carbon source (ethylene gas, 50 sccm) Carbon nanotubes with a mean diameter of about 70 nm were obtained.

EXAMPLE 22

A result identical with that of Example 21 was obtained by performing the procedure in the same manner as in Example 21, except that methane gas was used in place of ethylene as the carbon source.

EXAMPLE 23

A result identical with Example 21 was obtained by performing in the same manner as in Example 21, except that ethanol was used in place of water.

EXAMPLE 24

A result identical with Example 22 was obtained by performing in the same manner as in Example 22, except that ethanol was used in place of water.

EXAMPLE 25

Results analogous to those of Examples 1 to 8 were obtained by repeating the procedures of Examples 1 to 8, except that the experiments were carried out in a globe box, which is isolated from the outside contact to prevent the formation of metal oxides, in order to produce pure fine metal particles.

Described below is an example of synthesizing carbon nanotubes by means of catalytic nanoparticles comprising two metal species.

EXAMPLE 26

This example illustrates the result obtained when a catalyst was prepared in which a metal selected Pt, Pd, Rh, Ir, Ru, and Ni known for their high activity in dehydrogenation of hydrocarbons that are used as the carbon source, and iron together form nanoparticles, and was used in the synthesis of nanotubes.

To 40 ml of benzene, 3.516 g (10% by weight of benzene) of Tween®-20 and 0.0648 g (a quantity required for preparing a 0.01M benzene solution) of $FeCl_3$ were added, and the mixture was stirred for 2 hours. Then, $H_2PtCl_6$, $PdCl_2$, $H_2IrCl_6$, $RuCl_3$ or $NiCl_2$ was added to said mixture in an amount such that the atomic ratio of iron:metal was 7:3, and the mixture was stirred for another 24 hours to give a solution of nanoparticles.

It was confirmed by transmission electron microscopy (TEM) that the above-obtained nanoparticle solution contained fine metal particles with a size ranging from 4 to 30 nm. The size of the alloy catalyst particles appeared slightly greater than that of the particles of pure iron obtained in other cases. However, the size of the nanoparticles did not vary much with the type of metal.

The solution obtained above was introduced into the reactor in the same manner as in Example 1, and carbon nanotubes with a mean diameter of about 60 nm were obtained. It was recognized from FIGS. 7, 8 and 9 that the arrangement of carbon atoms was more regular in this case, compared with the nanotubes produced with a catalyst of iron only.

Figure 7:
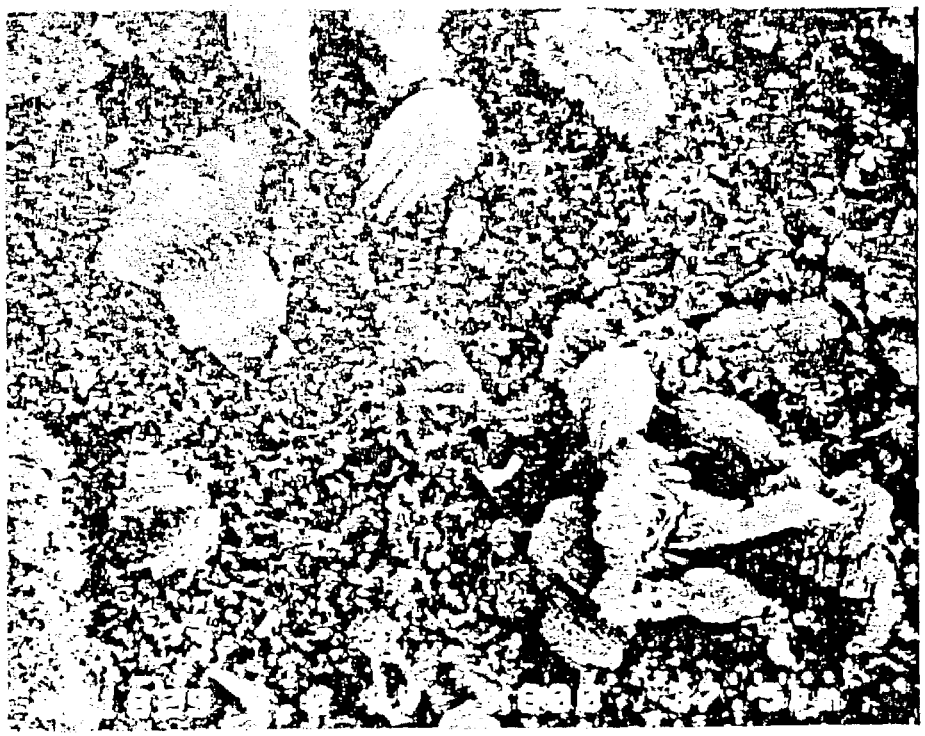
FIGS. 7 to 9 are the scanning electron micrographs (SEM) or transmission electron micrographs (TEM) of the carbon nanotubes prepared by using a metal mixture in Example 26.
Figure 8:
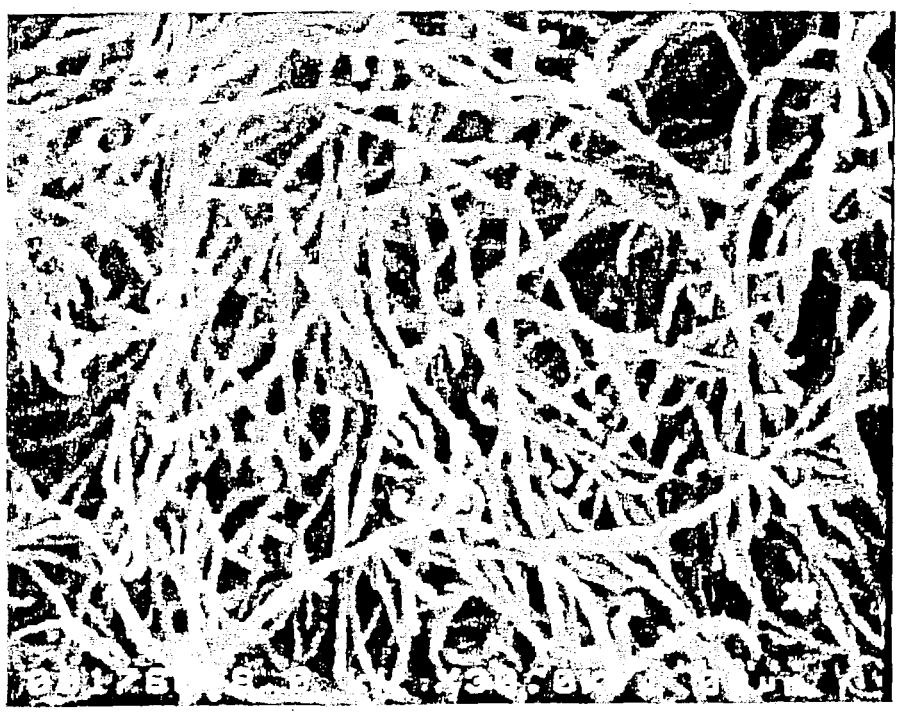
Figure 9:
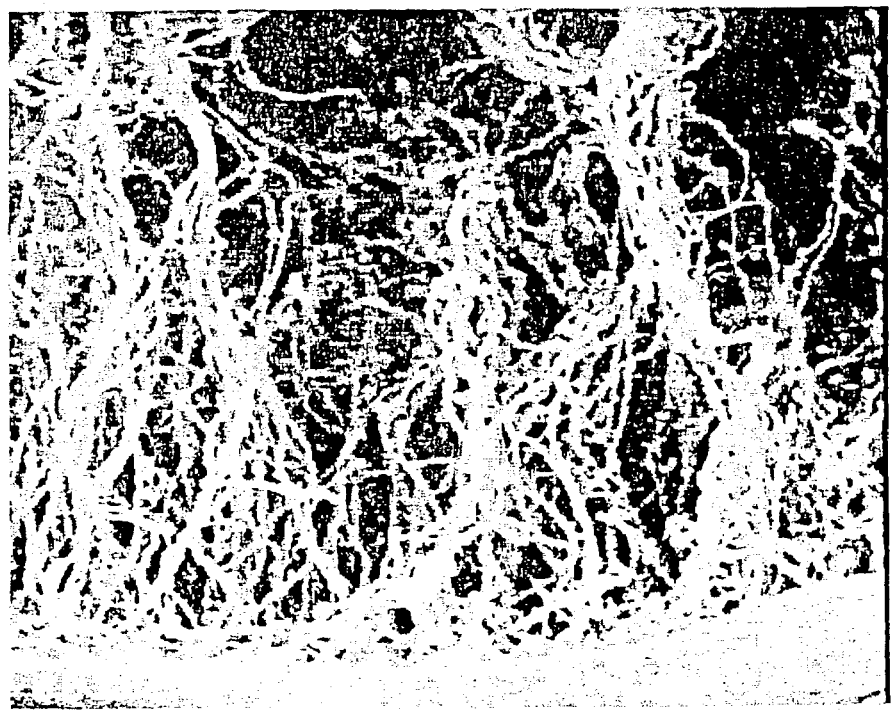

Specifically, FIG. 7 shows the result of the synthesis of nanotubes using the catalyst made of an alloy of iron and nickel, and it shows that nanotubes were produced uniformly in a large quantity. FIG. 8 shows the result of the synthesis of nanotubes using a catalyst made of an alloy of iron and platinum, and it shows that the arrangement was more regular, compared with the case where a catalyst of iron only was used, and that apparently the byproduct of carbon black was not produced. FIG. 9 shows the result of the synthesis of nanotubes using a catalyst made of an alloy of iron and palladium.

EXAMPLE 27

This example illustrates the result obtained when nanometer-sized catalyst particles comprising iron and copper were prepared and used in the synthesis of nanotubes in order to synthesize graphite nanofibers (GNF) which are utilized in the media for the storage of hydrogen.

To 40 ml of benzene, 3.516 g (10% by weight of benzene) of Tween®-20 and 0.0648 g (a quantity required for preparing a 0.01M benzene solution) of $FeCl_3$ were added, and the mixture was stirred for 24 hours. Then, $CuCl_2$ was added to said mixture in an amount such that the atomic ratio of iron:copper is 3:1, and the mixture was stirred for another 24 hours to give a solution of nanoparticles with a size ranging from 4 to 30 nm.

Figure 10:
FIGS. 10 and 11 are the scanning electron micrograph and transmission electron micrograph of the graphite nanofibers (GNF) synthesized in Example 27.
Figure 11:

The solution obtained above was introduced into the reactor in the same manner as in Example 1, and GNF with a mean diameter of about 100 nm were obtained. The SEM and TEM micrographs thereof are shown in FIGS. 10 and 11.

EXAMPLE 28

In this example, the same process was repeated under different reaction conditions using the nano-sized catalyst particles prepared in Example 1, in order to synthesize graphite nanofibers (GNF) which are utilized in the media for the storage of hydrogen.

Figure 12:
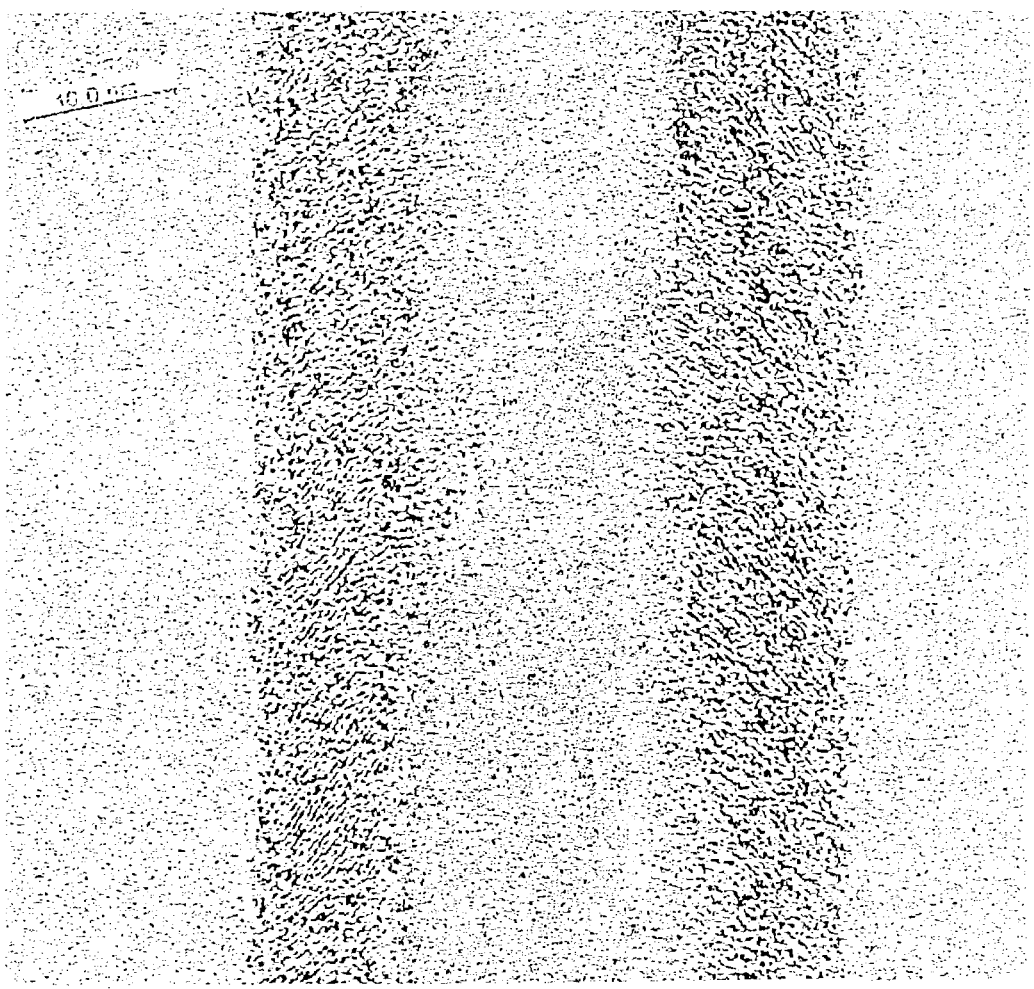
FIG. 12 is the transmission electron micrograph of the graphite nanofibers synthesized in Example 28.

Reaction was carried out by introducing the above-obtained solution (0.34 ml/min) and $H_2S$ gas (10 sccm) into a reactor at 800° C., together with a carrier gas (Ar, flow rate: 100 sccm) for 20 minutes, and the product was obtained as a black powder. The product obtained was analyzed by scanning electron microscopy (SEM) and a transmission electron microscopy (TEM) to find that GNF with a mean diameter of about 60 nm were obtained, the TEM micrograph of which is shown in FIG. 12.

EXAMPLE 29

This example illustrates the result obtained when nano-sized catalyst particles comprising iron and atomic sulfur were prepared and used in the synthesis of nanotubes in order to synthesize graphite nanofibers (GNF) which are utilized in the media for the storage of hydrogen.

To 40 ml of benzene, 3.516 g (10% by weight of benzene) of Tween®-20 and 0.0648 g (a quantity required for preparing a 0.01M benzene solution) of $FeCl_3$ were added, and the mixture was stirred for 2 hours. Then, $Na_2S$ was added to said mixture in an amount such that the atomic ratio of iron:sulfur was 1:2, and the mixture was stirred for another 24 hours to give a solution of nanoparticles with a size ranging from 4 to 30 nm.

The solution obtained above was introduced into the reactor in the same manner as in Example 1, and GNF with a mean diameter of about 100 nm were obtained.

INDUSTRIAL APPLICABILITY

In conclusion, according to the present invention, since the particle size and the composition (the types and proportions of the metals) of the metal catalyst introduced are adjusted in advance, the morphology and structure of the carbon nanotubes produced may be more easily controlled. Further, as the metal catalyst can be supplied continuously, carbon nanotubes may be produced continuously in large scales, and the supply of the metal catalyst together with a carbon source from the outside allows simplification of the process as well as the apparatus. Also, since the reaction conditions are mild, carbon nanotubes or graphite nanofibers having various morphologies, structures and characteristics may be produced easily at reasonable costs. Hence, the process of the present invention is highly reproducible and industrially promising.

What is claimed is:

1. A process for the preparation of carbon nanotubes, which comprises:
    (1) preparing a colloidal solution containing metal nanoparticles by
    (1a) adding a metal salt to a solvent selected from water or alcohols in the presence of a nonionic surfactant wherein the nonionic surfactant is selected from the group consisting of nonionic surfactants of hydrocarbons, silicones and fluorocarbons and in the amount of at least 10% by weight of the solvent at the time of reaction, and
    (1b) reducing the metal salt in the colloidal solution,
    (2) introducing the resulting colloidal solution into a reactor together with at least one of a carrier and/or a carbon source either separately or in the form of a gaseous mixture, and
    (3) forming carbon nanotubes.

2. The process according to claim 1, wherein the reducing agent is selected from the group consisting of inorganic compounds such as hydrazine, $LiBH_4$ and $NaBH_4$; surfactants having a functional group with reducing power such as ethylene oxide; organic compounds with reducing power; and mixtures thereof.

3. The process according to claim 1, wherein alcohol is selected from the group consisting of ethanol, propanol and mixtures thereof.

4. The process according to claim 1, wherein the metal of the metal salt used is at least one metal selected from the group consisting of transition metals, noble metals, alkali metals and alkaline earth metals.

5. The process according to claim 1, wherein the metal nanoparticles are selected from the group consisting of elemental metals, their oxides, nitrides, borides, sulfides, and mixtures thereof.

6. The process according to claim 1, wherein the carbon source is selected from the group consisting of a nonionic surfactant of hydrocarbons, silicones and fluorocarbons; alcohols having 1 to 6 carbon, atoms; carbon monoxide; saturated or unsaturated aliphatic hydrocarbons having 1 to 6 carbon atoms; and aromatic hydrocarbons having 6 to 10 carbon atoms, which may have 1 to 3 heteroatoms selected from the group consisting of oxygen, nitrogen, chlorine, fluorine and sulfur.

7. The process according to claim 6, wherein a characterized gas such as $H_2$, $H_2S$ and $NH_3$ is additionally supplied.

8. The process of claim 1, wherein the colloidal solution is introduced in the form of a gaseous mixture, wherein said gaseous mixture is formed by suspending the colloidal solution in a gaseous phase.

* * * * *